May 24, 1966  A. M. ZALKIND  3,252,248

LINE FOLLOWER DEVICE, ESPECIALLY FOR TOYS

Filed March 7, 1963

INVENTOR
Albert M. Zalkind

United States Patent Office 3,252,248
Patented May 24, 1966

3,252,248
LINE FOLLOWER DEVICE, ESPECIALLY FOR TOYS
Albert M. Zalkind, Arlington, Va.
(1026 Warner Bldg., Washington 4, D.C.)
Filed Mar. 7, 1963, Ser. No. 263,646
7 Claims. (Cl. 46—244)

This invention relates to toys and more particularly to a device capable of following an arbitrarily drawn, eraseable line, and is a continuation-in-part of my previously filed patent application Ser. No. 721,128, filed March 13, 1958, now Patent No. 3,083,503, issued April 2, 1963.

It is an object of the invention to provide means whereby a toy, for example in the form of a dog, can follow a two-dimensional graphic path, which path may be obliterated or erased and a new path drawn as suits a child's fancy.

It is another object of the invention to provide a device simple and rugged in nature and economical to manufacture for simulating the motion of a toy animal, car, etc., which moves in a predetermined manner to follow an arbitrarily drawn line.

It is a further object of my invention to provide tractive means actuated by electrical motors wherein gears, pulleys, belts, and even wheels are eliminated.

It is a yet further object of my invention to provide an arrangement wherein battery current is conserved.

Other objects and features of my invention will be apparent from the description to follow.

Briefly, the invention contemplates the use of electrical conductivity wherein feeler means in the form of contacts follow an insulated line placed on a metal surface, or conversely, a metallic and conductive line placed on an insulating surface.

Referring now to the drawing.

Figure 1:
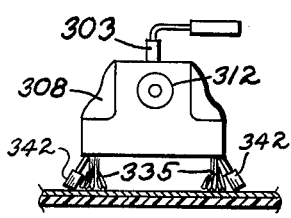
FIG. 1 is a front view of a version of the toy wherein an improved sensor means is utilized and the construction is such that no oscillatory mass is used.

Reference is made to Patent No. 3,083,503 for explanation of operational and structural detail omitted herein.

In the form of the invention shown in FIGS. 1 through 13, the principle of operation and steering is the same as heretofore described in the aforementioned patent except that one pole of the battery connects to the metal surface of the board and the other pole connects to the motors via a single wire flexible lead. Speed control is effected either by a variable resistance or by pulsing the current or by both methods. No special mass or weight is used for oscillating the toy. Such oscillation is of advantage with sliding contacts, as heretofore disclosed, since the contacts and board pick up wax or dye smears and the impact of oscillation raises the contact pressure to increase conductivity. The contact or sensor elements used in these additional modifications are reversed brush tufts of phosphor bronze or the like having loop portions engaging the board. Contacts of this type have been found surprisingly effective after long experimentation with a large variety of sensor elements. The running time before cleaning is needed is far longer than for other types of solid surface sliding sensors which have been tried.

The brush sensors referred to above were tufts taken from ordinary suede leather shoe wire brushes, phosphor bronze, reversed so that the loops engaged the board, the wire ends being uppermost. Operable dimensions were found in a wide range as to wire diameter (.005"–.0100"), sensor length (¼"–¾"), number of loops per sensor (5–25). However, the preceding data is for information only, and not limiting.

These loops make excellent contacting media even on boards which are obviously dirty; they do not cut off current even though accumulating dirt and wax smears, and they minimize scraping of the path to be followed. Of course, occasional cleaning which can be readily accomplished with a small brush, for example, something in the nature of a toothbrush or even another suede leather brush, is required since, ultimately, the sensors will scrape up enough dirt and coloring media to give trouble. All sorts of coloring media have been tried with such reversed tufts and have been found workable, e.g. crayon, paint, etc., have heretofore been mentioned for making the path. However, in addition to these media, I have successfully used liquid shoe polish, water-type tempera colors, felt-tip inking pens, and children's finger paint.

Such media have the advantage of being readily removed by rubbing with a rag wetted with an ordinary household liquid detergent, and/or use of a copper scouring pad.

While the oscillatory weight models heretofore disclosed have been found practical and have an interesting spectacle action, unfortunately, due to the fact that the weight must be moved, a certain amount of battery energy is used in so doing. By making a model just heavy enough to effect sufficient electrical contact pressure and torque transmitting pressure, battery energy can be conserved. However, the automatic speed control effect of the oscillatory body weight is sacrificed. Where a power pack operating off house current can be used there is of course no problem, but for maximum cheapness of the toy such a power pack cannot be provided and battery operation must be used.

By eliminating the bobbing mass, some means must be provided to prevent the toy from speeding so that it will not shoot right over a curve in the path and I have found that this can be done in several ways. For example, if the path is made very wide, say about one inch or so, and suitably heavy or dense, there will be enough time lapse of current cut out of one motor to permit the other motor to take over for steering effect. Also, if the path be drawn in a wax media such as crayon, a very wide path would have a frictional drag effect, particularly where the crayon was freshly applied and had not yet glazed over. Some crayons have a very pronounced drag, for example, tire-marking crayons which are extremely soft. However, there are certain drawbacks to the use of extremely soft crayons, in that they tend to foul or cake the sensors sooner than ordinary crayon. Also, the effort of preparing a path which is an inch wide might be discouraging to a child, although it is contemplated that tracks will be drawn with the aid of a cardboard stencil having various straight line and curved cutouts therethrough which can be selected in various combinations to make a composite path.

Accordingly, I believe it preferable to use a purely electrical type of speed control, and a very simple and cheap method of achieving the effect is by merely pulsing the current so that energy is supplied intermittently at the rate of approximately 2 to 5 pulses per second. Pulsing can be readily accomplished by a hand held metallic contact connected to one pole of the battery by a flexible lead; such contact being tapped against the board. The rate of tapping determines, inversely, the speed at which the toy will run in the sense that the shorter the interval of engagement between the board and the contact, the slower the speed, and this makes for a higher rate of pulsing per second. Speed can be controlled entirely by this method, although it is preferable, while not necessary, to provide some additional control such as variable resistance to permit a predetermined amount of current to pass to the toy motors. This is used primarily where the batteries are very fresh or where more batteries are used than the voltage requirement of the motors. Variations of effecting speed control are disclosed and will be hereinafter described.

Referring to the drawing, the toy comprises slant mounted motors 300 having a common terminal connection to a sleeve 303 carried by body 305 of the toy and passing upwardly through a housing 308 which may have an ornamental button type eye 312 fastened at the front thereof. An angular metallic connector 315 is slidably and rotatively accommodated in sleeve 303 and can be inserted therein or removed therefrom. The connector 315 is at the end of a flexible lead 318 which extends over a boom 322 carried angularly over the board 325 by securement to a battery carrier base 329. Thus, it will be understood that as the toy follows a path such as 332 on the board, the connector 315 can rotate in sleeve 303 to prevent the wire lead 318 from fouling or twisting up.

Figures 2, 3:
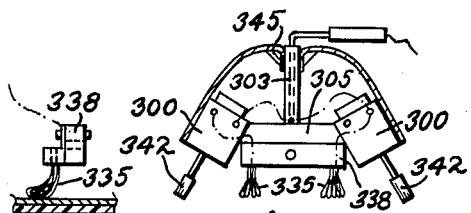
FIG. 2 is a front view partially in section of the toy showing the mechanical mode of electrical connection support.
FIG. 3 is a side view showing a brush detail.

The other terminals of the motors are connected to respective brushes 335 carried in a swivel block 338 suitably pivoted to the motor base which carries the motors at an angle, as shown in FIG. 2 and as heretofore shown and described in many other modifications of the invention. The brushes 335 are bundles of wire loops, as described above, suitably mounted so that a plurality of bights engage the board, and preferably, though not necessarily, bent somewhat rearwardly at their tips as shown in FIG. 3.

The motor shafts are tipped with rubber or plastic sleeves 342 which may be forcibly slid towards the shaft ends as they wear. Flexible plastic sleeves get excellent traction and I have found that plastic tubing of the type molded with external ribs is fine for the purpose.

The housing 308 can be any simple plastic molding frictionally carried on sleeve 303 by means of an integral collar 345 which is slidable with reasonably tight gripping engagement on the sleeve. Polyethylene plastic would be suitable for such construction.

Figure 4:
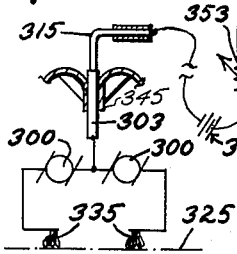
FIG. 4 is a diagrammatic layout of the electrical connections in conjunction with various mechanical components.

The battery base 329 may carry a battery housing such as 350 to the top of which may be mounted a rheostat such as 353 and it will be understood that any conventional battery holder (not shown) within the housing holds a pair of flashlight cells, as indicated at 356 in FIG. 4, one terminal of the batteries being connected to the connector 315 and the other terminal connected through the rheostat 353 to a handle 360 of insulating rod or tubing, of the order of three inches in length. A flexible lead 363 from the rheostat passes therethrough and is internally connected to a small compression spring 366, the outer end of which is abuttable with the board 325 in order to complete a circuit. Such simple arrangement, as depicted in FIG. 4, provides excellent speed control by intermittently touching the end of spring 366 to the board and a degree of control is afforded by the amount of pressure used with each tap against the board. Further, by making the diameter of the spring small relatively to the diameter of the rod 360, the handle can be laid down, as it undoubtedly will be, on the metal board without causing current to continue through the toy. In other words, the spring will be kept separated above the board by the thickness of the handle. This is of some importance in order to prevent deenergization of the batteries when the toy is not actually being used, since sometimes the batteries will run so low as to drop below the cutoff voltage of the motors, but if allowed to rest for a while, they will revive. This is a well known characteristic of flashlight cells, due to polarization. However, if current is permitted to remain on, due to carelessness, in the thought that since the toy is not running no current is being used, the batteries will in all probability be completely ruined.

The rotative and removable connector 315 permits the toy to follow any path, and also affords a safety feature in that it can pull out of the sleeve 303 to prevent wire breakage or solder joint breakage between lead 318 and the connector 315 in the event the toy is roughly handled. Lead 318 may connect to the battery holder (not shown) in any suitable manner and preferably boom 322 is tubular so that the lead can run therethrough and emerge near the base for entry into the battery housing 350 via a slot as shown. The connections for the rheostat 353 can be made in any obvious manner within the housing by flexible leads having sufficient slack so that the housing can be removed from the battery holder for battery replacement. The weight of base 329 and the battery housing and holder should be sufficient to keep the boom 322 in position. The boom may be merely a length of wood dowel and is preferably frictionally secured in its base socket so that it can be removed for flat packaging.

Other modes of speed control have been found to be effective. For example, instead of or in addition to the rheostat, and to enhance play value, a small piece of conductive carbon 370 (FIGS. 5 and 6) carried in a piece of insulating board 373 and exposed at both surfaces thereof so as to contact the board and be engageable with the metal tip 376 in handle 380 intermittently tapped against the piece of carbon and depending on the frequency of tapping and the pressure exerted, speed control can be achieved. I have found that a carbon disc about ¼ of an inch thick cut from the positive electrode of a standard No. 6 cell gives excellent results. Depending upon the condition of the batteries, tapping can be eliminated and variation in pressure of tip 376 on the carbon can be used, most especially if a resilient spring tip handle, such as 360, is used against pressure response material, such as carbon or equivalent. However, I believe it preferable that tapping, that is, pulsing of the current, be used because the intermittent current takes less battery energy than a continuous running current and the batteries will last longer.

Figure 7:
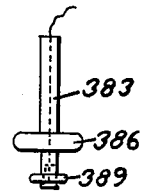
FIG. 7 is an elevation of a modified type of electrical component used for contacting the board and effecting current pulsing.

The tip 376 can also be used by sliding it back and forth across the carbon piece starting and ending on the insulation which surrounds the carbon. This is the equivalent of tapping. In place of a tip 376 a metal roller could be used, as shown in FIG. 7, wherein the handle 383 has a flange 386 somewhat larger in diameter than the roller 389 so that laying down of the handle on the board will prevent the roller from engaging the board and using needless battery current. Also, the flange 386 can serve as a guide against the edge 392 of the insulating member 373 for guiding the roller back and forth across the carbon base.

Obviously, many pulsing devices can be devised, for example, a rotary switch arm (not shown) sweeping around a circle of metallic contacts, either manually or motor driven, etc., wherein the rate of rotation can be varied to control the pulsing. Of course, where a motor is used to rotate the sweeping arm, power from a house line power pack such as used with toy trains would be preferable, due to the extra current required for that motor. Further, various types of circuits are available which can provide pulsing, and in fact such circuits have long been known in connection with motor control, wherein vacuum tubes, transistors, etc., are relied on in purely non-mechanical arrangements.

Figure 5:
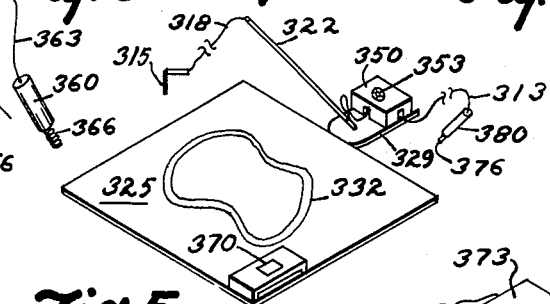
FIG. 5 is a perspective of the board and certain electrical components used in conjunction therewith.
Figure 8:
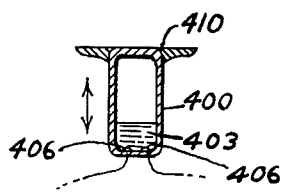
FIG. 8 is a further modified electrical component shown in cross sectional elevation for effecting pulsing.

A variation in devices for providing pulsing is shown in FIG. 8, wherein a mercury switch capsule 400 has a globule of mercury 403 therein which can shunt contacts 406 in the position shown. Such a capsule can be shook to make and break the circuit and, when inserted in a line such as 383 of FIG. 5, is effective for pulsing the current. In such case, a permanent connection could be made from either lead of the contacts 406 to the board. The widened flange 410 can be used as a base on which the capsule rests when not in use, the mercury then not effecting any shunt, thus to disconnect the circuit.

Figure 9:
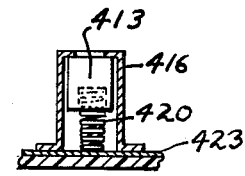
FIG. 9 is a modified electrical component for effecting a variable resistance.
Figure 6:
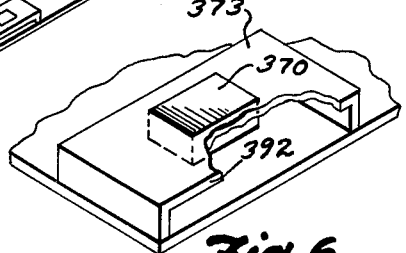
FIG. 6 is a perspective of one of the electrical components.

FIGURE 9 illustrates a variation of a speed control wherein a carbon pellet 413 is retained slidably in a metallic casing 416 which is conductively secured to the metallic surface of board 423. The carbon pellet is conductive and is biased by a spring 420 upwardly, the spring serving as a conductive connection between the pellet and the metal board facing. A contact tip such as 376 of FIG. 5 can be pressed with varying pressure against the top surface of the carbon pellet to effect speed control. The spring should preferably have some yieldability under manual pressure. Either steady pressure or pulsing can be thus effected, for full current 376 need merely be slid sideways to engage the over-hanging flange edge of sleeve 416.

Figure 10:
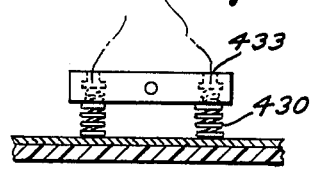
FIG. 10 shows a modified form of sliding contacts or sensors.
Figure 11:
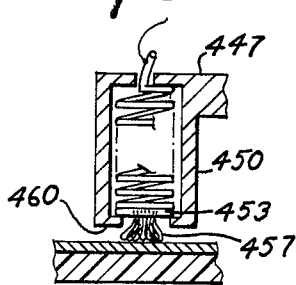
FIG. 11 shows a further modification of the sensors of FIG. 10.

FIGURE 10 shows a modified form of contacts which have been found to operate successfully, although not as impervious to long-running apparatus without caking with wax and smears. Thus, the light compression springs 430 are carried in the swivel block 433 which is equivalent to swivel block 338 of FIG. 2. The lower ends of the springs engage the metallic board surface and slide thereon. I have found that springs which are sufficiently light and resilient can achieve a rocking effect of the toy and some measure of speed control is actually thus afforded without any specific mass being added of an appreciable nature. The action of the up and down pitching of the toy is interesting to watch and has spectacle value. However, the springs must be of light gauge and are thus easily subject to damage, especially in the hands of a child. An improved version is shown in FIG. 11 wherein the swivel block 447 is formed with a downwardly extending sleeve 450 to protect the spring which, at its lower end, has secured thereto a washer 453 and a wire contact brush tip 457 of the type exemplified in FIG. 1, with downwardly extending bights. Thus, the bounce effect is preserved by the use of the spring, the excellent contact characteristics of the reverse wire brush tuft is utilized, and the washer secured to the spring prevents a child from grasping the brush and try to pull the spring out of the housing 450 due to the radially extended inward lip 460, at the bottom of such housing.

Figure 12:
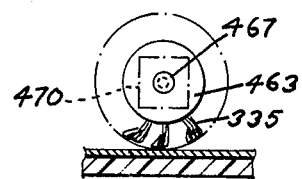
FIG. 12 shows a modification of sensors utilizing a plurality of brush tufts mounted rotatively.

FIGURE 12 is a modification of a sensor element wherein a plurality of tufts, such as 335 (FIG. 1) are mounted in a rotative hub 463. Thus, as the toy moves, the brushes rotate in the direction of the arrow. This prevents a dragging action and contemplates increasing the time that the sensor can run without the need for cleaning. The hub 463 can be metallic and carried on a metallic pin or rivet 467 suitably secured to the end of a swivel block 470. A wire lead can be soldered to the pin for connection. In place of a pin a threaded bolt could be used, threaded into block 470 so that it can be tightened to prevent rotation of the hub. Thus, one brush on each side of the block would be used, and when such pair of brushes required cleaning, the hubs could simply be adjusted to bring a fresh pair of brushes into play. All brushes would be cleaned at the same time.

Figure 13:
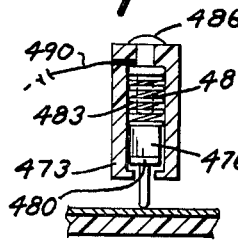
FIG. 13 is an elevational cross section of a further modified form of speed control.

In FIG. 13 is illustrated a modification utilizing an insulating tubular handle 473 having slidably arranged therein a carbon pellet 476 which abuts the head of a slidable pin 480 that extends outwardly of the handle for contact with the board surface. At the other side of the carbon pellet is a compression spring 483, one end of the spring bearing against the pellet and the upper end bearing against the lower head of a rivet 486 having a lower shank 487. A wire lead 490 is clinched to the rivet, as shown, for connection to a battery. Thus, current from the battery is directly connected to rivet 486 and thence to pin 480 via spring 483 and carbon pellet 476. Either the pin or the rivet may be used for speed control. For example, the outer end of the rivet 486 can be tapped against the board for current pulsing. If the handle be reversed so that pin 473 abuts the board, then handle pressure serves to compress spring 483 to any predetermined degree for current control by spring pressure on the pellet, until the pellet abuts solidly with the lower shank of the rivet for maximum current. If the pellet be short, such abutment plus additional pressure will effect close to the maximum current that the battery can yield. Also the pin may be tapped against the board for pulsing. Depending upon the condition of the batteries, better control would be expected from pin 473 if the batteries were exceedingly fresh or effected more voltage than the motor requirements. However, where the batteries are deteriorated, then pulsing with rivet 486 would be preferable, since maximum current is then achieved with each pulse, and battery current is conserved between pulses.

In all modifications of FIGS. 1–13 the motors are slant mounted and the shafts operate directly on the board as "wheels" with or without frictional sleeves, to preserve economy of construction by eliminating any need for step down gearing in order to effect as simple and low cost a toy as possible. It will, of course, be recognized that elements other than tubular plastic sleeves can be applied to the shafts just so long as the torque load on the motors and the toy speed are not materially affected.

Having thus described my invention, it is apparent that various changes may be made without departing from the spirit thereof, and therefore do not seek to be limited to the precise illustrations herein given, except as set forth in the appended claims.

What is claimed is:

1. An electrical toy comprising an electrical driving means and a member having a conductive surface, means comprising a contact for conducting current to said driving means and being engageable with said surface, such contact being a reversed brush tuft having wire loops engaging said surface and said loops being disposed to be individually flexible in the direction of movement of said toy.

2. In combination with means having a conductive surface, an electrical contact for engagement therewith, means for providing relative motion between said surface and said contact, said contact comprising a cluster of wires bent so as to have looped portions disposed for moving conductive engagement with said surface, and an insulating coating on part of said surface made of a removable material having adherent qualities and capable of reducing conductivity between said contact and said surface, whereby fouling of said contact with said material and scraping or cutting of said material by said contact are minimized, said wires being of resilient metallic composition.

3. An electrical toy as set forth in claim 1, and a compression spring carrying said contact and being carried by said toy.

4. An electrical toy as set forth in claim 1, and at least one additional contact, and a hub carried by said toy and carrying said contacts and means for effecting a rotative mount for said hub whereby said contacts may effect engagement with said surface at different times.

5. An electrical toy as set forth in claim 1, including a source of current and means for intermittently connecting said source to said conductive surface, whereby said driving means receives current pulses for effecting speed control.

6. An electrical toy as set forth in claim 1, and speed control means for controlling speed of said driving means and comprising an electrical contact member, a source of current, said contact member being connectable intermediate said current source and said surface element, and actuatable means for effecting rapid intermittent connection between said current source and said conductive surface by movement of said contact member.

7. An electrical toy as set forth in claim 6, said speed control means comprising a resistive element having variable conductivity responsive to pressure thereon, said actuatable means comprising a handle, said resistive element and said contact member being carried by said handle and being in electrically connected relation with each other.

References Cited by the Examiner
UNITED STATES PATENTS

| | | | |
|---|---|---|---|
| 2,054,644 | 9/1936 | Wulfert | 46—243 |
| 2,894,078 | 7/1959 | Harkins | 191—45 |
| 2,938,185 | 5/1960 | Dill | 338—89 |
| 3,014,100 | 12/1961 | Zablocki | 191—45 |
| 3,083,503 | 4/1963 | Zalkind | 46—244 |
| 3,086,319 | 4/1963 | Frisbie et al. | 46—244 |
| 3,124,902 | 3/1964 | Gowland et al. | 46—243 |
| 3,130,803 | 4/1964 | Wiggins | 46—244 |
| 3,157,770 | 11/1964 | Beaulieu | 399—9 X |
| 3,159,109 | 12/1964 | Braverman | 46—243 X |

DELBERT B. LOWE, *Primary Examiner.*

RICHARD C. PINKHAM, *Examiner.*

R. F. CUTTING, *Assistant Examiner.*